Aug. 16, 1938.  A. AMES, JR., ET AL  2,126,713
TESTING BINOCULAR VISION
Filed March 18, 1936   2 Sheets-Sheet 1
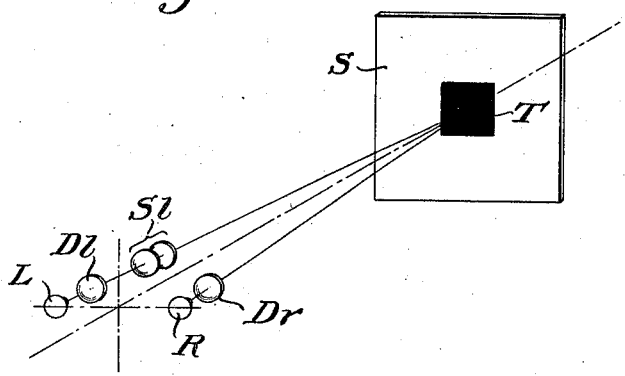
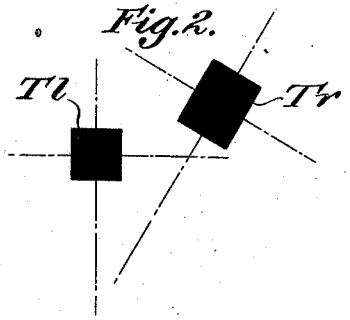
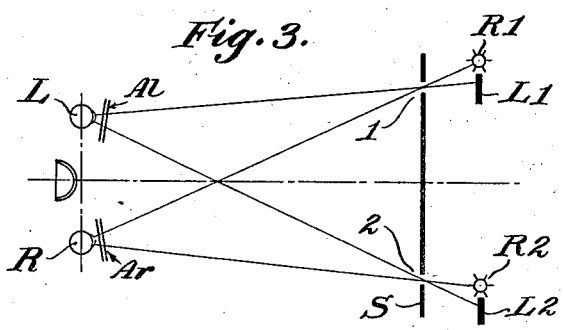
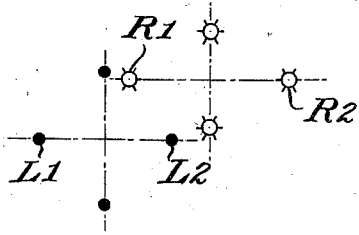
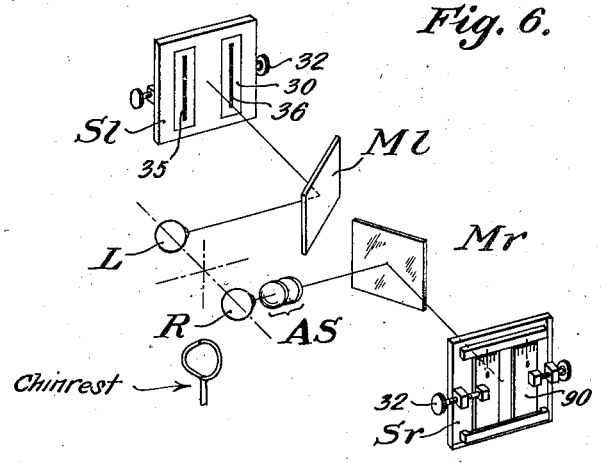
Inventors,
Adelbert Ames, Jr.,
Gordon H. Gliddon,
by Roberts, Cushman & Woodbury
Attys.

Aug. 16, 1938.  A. AMES, JR., ET AL  2,126,713
TESTING BINOCULAR VISION
Filed March 18, 1936  2 Sheets-Sheet 2
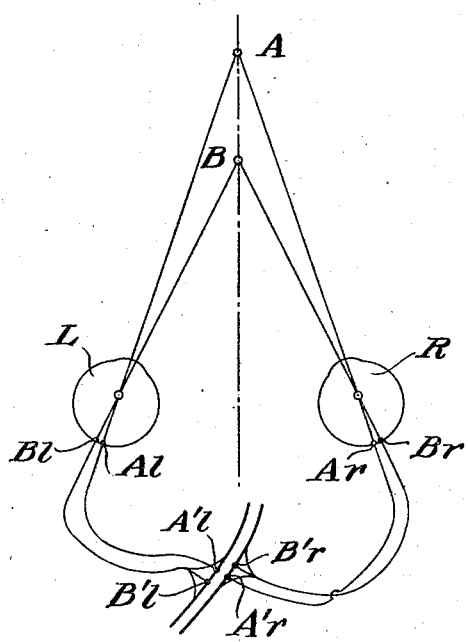
Fig. 5.
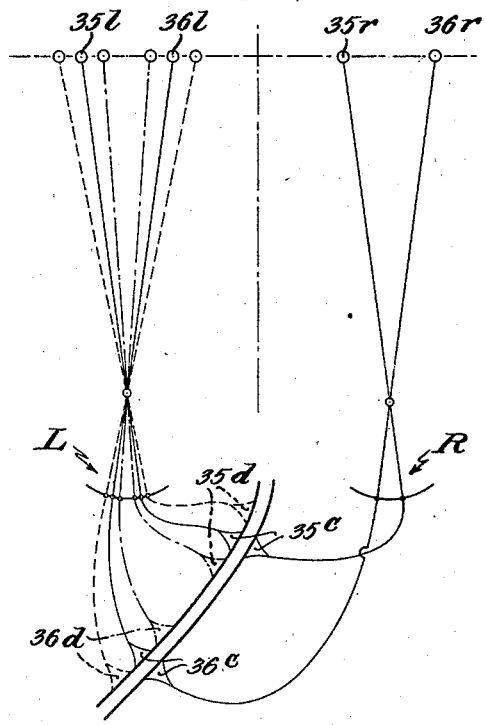
Fig. 7.
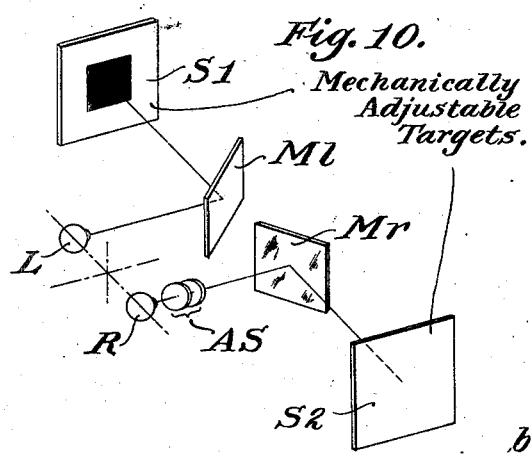
Fig. 10. Mechanically Adjustable Targets.
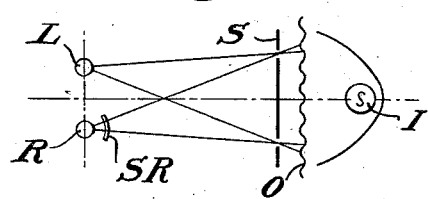
Fig. 9.
Inventors,
Adelbert Ames Jr.,
Gordon H. Gliddon,
by Roberts, Cushman & Woodbury
Attys.

Patented Aug. 16, 1938

2,126,713

UNITED STATES PATENT OFFICE 2,126,713

TESTING BINOCULAR VISION

Adelbert Ames, Jr., and Gordon H. Gliddon, Hanover, N. H., assignors to Trustees of Dartmouth College, Hanover, N. H., a corporation of New Hampshire Application March 18, 1936, Serial No. 69,493

19 Claims. (Cl. 88—20)

This invention deals with the testing of binocular vision, more particularly with a method for comparing discrepancies and relative deviations of ocular images and with apparatus for carrying out that method.

The term "ocular image" describes the final impression received in the higher brain centers through the vision of one eye. The effective magnitude and shape of this impression are determined not only by the properties of the dioptric image as formed on the retina, but also by the modifications imposed upon that image by the anatomical properties and physiological processes by which the optical image upon the retina becomes evident in the higher cortical centers.

Letters Patent No. 1,944,871, of January 30, 1934, describes generally the method of testing binocular vision for ocular image discrepancies by relating, for comparison thereof, conscious appearances of the respective ocular images of test means, adjusting the respective appearances, and measuring the defect, if any, through such adjustments. This patent describes particularly by way of example a method utilizing a distinct fixation object, or fusible fixation objects determining the vergence of the eyes. It was found that it is in certain instances possible, or even desirable, to dispense with such distinct fixation or fusion objects, because this may simplify certain tests, or permit peculiar and sometimes instructive modifications of tests ordinarily using fixation objects, or because the patient can not fuse at all so that separate fixation and measuring elements would be useless and sometimes even irritating.

It is one of the principal objects of the present invention to provide a method for testing ocular image discrepancies by dispensing with distinct fixation objects, and apparatus for carrying out that method.

In some of its aspects, the invention contemplates the examination of patients suffering from double vision (diplopia), for defects which may cause that condition and whose correction may cause restoration of fused binocular vision. When subjected to such tests, the patient looks either at a single object with both eyes, or with each eye at an object only visible to that respective eye and compares the appearance of the objects which, due to the lack of fusion, will effect two distinct ocular images no matter whether like or unlike, or produced by a single or by two separate test objects.

If the patient has fusion, it may be preferable to use, according to another aspect of the invention, two unlike test objects for comparison without fixation object.

In either case, the ocular images can be adjusted following the patient's observation and directions (in the case of diplopic patients sometimes until they are able to fuse because of the substantial elimination of the underlying defect) and the defects measured by observing the degree of adjustment.

In such tests, the effect of the so-called fusional (Panum's) areas is not particularly taken into account.

Another feature of the invention is a test suitable for comparison which, like the above-mentioned test for diplopic persons, uses test objects producing ocular images of similar character (no provisions for presenting distinct fusion objects being made), but in such a manner that fusion of at least portions thereof can be induced and broken at will. Tests of this type permit a novel determination of ocular image discrepancies by adjusting the relative appearance of the ocular images until fusion breaks, determining fusional amplitude in either direction and determining an average ocular image discrepancy in a manner to be described more in detail hereinafter.

For carrying out any of the above modifications of the present eye testing method, apparatus according to U. S. Patent No. 1,944,871, and copending application Serial No. 706,523, filed January 13, 1934, can be suitably modified as will be described more in detail hereinafter, which modifications are also an object of the invention.

These and other objects and aspects of the present invention will be better understood from the following description of several practical embodiments thereof, as examples illustrating its genus. This description refers to drawings in which:

Figs. 1, 3, 6, 9, and 10 are diagrammatical representations of various testing arrangements for carrying out the present invention;

Figs. 2, 4, and 8 illustrate the appearance to the patient, of test objects according to the invention; and Figs. 5 and 7 illustrate the function of fusional areas.

Tests where initial fusion is avoided, either due to the nature of the defect, or by using suitable methods of examination, will first be described.

Referring to Fig. 1, the patient is placed before a screen S, his eyes being preferably positioned in predetermined relation to the test screen by means of a suitable head support. Only the eyes R and L are indicated in Fig. 1, in order to simplify the drawing.

Screen S is provided with a test object T, for example a square. Provisions are made for placing test lenses in front of the patient's eyes, preferably by means of lens holders associated with the head support, although conventional trial frames might be used.

The dioptric defects of the eyes are first detected in known ways, preferably as described in the above-identified copending application. Lenses for correcting such defects are placed before the patient's eyes, as indicated at D*l* and D*r* of Fig. 1. The patient, not being able to fuse his ocular images, will see the test target somewhat in the manner as indicated in Fig. 2, where T*l* indicates the appearance of object T to the left eye and T*r* its appearance to the right eye.

In an actual case, a black square at a distance of approximately 15 feet from the patient (whose dioptric errors were corrected) was seen approximately as a square with the left eye, whereas the right eye perceived the test object as a rectangle of dimensions larger than the conscious appearance of the ocular image of the left eye. Fig. 2 illustrates this particular instance. After a considerable number of trials, lenses having no dioptric power, before the left eye, as indicated at S*l* of Fig. 1, providing 5% overall and 5% meridional (in the vertical meridian) magnification brought relief to the patient who was with that correction able to fuse his ocular images. With this preliminary correction, it was thereafter possible to take quantitatively more accurate tests on an instrument as for example described in the above-mentioned copending application.

In some cases it may be desirable to bring the two appearances into closer juxtaposition in order to help the patient to compare them; this can sometimes be accomplished by means of prisms tending to overcome to some degree at least muscular defects causing diplopia.

As pointed out above, patients with diplopia can be tested by means of a single test object. In certain instances it is desirable to test without using a fixation object patients who are able to fuse in binocular vision, by comparing ocular images which can neither be fused nor related to a fixation object. In that case it becomes necessary artificially to break fusion. This is, for example, possible by performing the test with an instrument as described in the above identified copending application, by eliminating any visible test means that might induce fusion. Such a test is indicated in Fig. 3 where R and L are the eyes, S a mask having openings 1, 2 arranged to form a certain pattern, R1, R2 lamps visible to the right eye only, L1, L2 dark screens visible to the left eye only, and where A*l* and A*r* indicate lenses for adjusting the apparent relative position of the ocular images of the test object, and for varying the apparent size relation of the target elements. In this manner, the eyes are presented with objects of strictly similar spatial arrangement, but of different character, here, light and dark points at equal distances in the vertical and horizontal meridians. A conscious appearance of ocular images induced in this manner is illustrated by way of example in Fig. 4 which would indicate both vertical and horizontal phoria and a meridional size defect, as will now be evident without further explanation.

Again, ocular image differences are detected by comparison of the two appearances, trial lenses being applied to the eyes of the patient as the situation may require, and the nature and amount of the defect determined from these observations and trial corrections.

In the above described instances, the effect of the fusional areas is not particularly considered. The embodiment now to be described utilizes the existence and physiological function of these areas for determining ocular image differences by presenting to the eyes, without a distinct fusion means, test objects having elements which are of sufficiently similar character to be fused, but fusion of which can be at least partially broken when one ocular image is changed beyond the patient's range of fusional amplitude. This embodiment might also be characterized as avoiding distinct fixation objects and employing like images for breaking fusion.

The concepts fusional area and fusional amplitude will first be explained as far as necessary for the understanding of this aspect of the invention.

Referring to Fig. 5, if eye R and L are looking at an object, point A of that object will be imaged at A*r* and A*l* of the respective retinas, and transmitted to brain centers A'*r* and A'*l*. If A'*r* and A'*l* are corresponding cortical points, it is clear that object point A will be fused in binocular vision. It can, however, be shown that object points are fused which are not imaged on corresponding points of the retina. It is, for example, evident that point B in Fig. 5 is imaged at B*r*, B*l* to the right and left, respectively, of A*r* and A*l*. Since it will be possible to fuse point B within a certain range of disparity of its images on the retina, there must exist areas within which images are fused although the respective image points do not exactly correspond. A plausible explanation of this phenomenon assumes the existence in the brain center correlating the impressions originating in the respective eyes, of secondary nerve connections as shown around B'*r* and B'*l* of Fig. 5. It is then evident that points will be fused if secondary connections overlap, and that the fusional areas can be defined by the extent of secondary connections to the cortical center from a retinal point of innervation.

For carrying out the test, both eyes of the patient are presented with similar test objects, for example by means of the instrument described in the previously mentioned Patent No. 1,944,871, as schematically shown in Fig. 6. It wil be noted that screens S*l* and S*r* of this figure are an adaptation of the targets shown for example in Figs. 9 and 10 of that patent, from which targets the object 30 has been omitted. The screens have windows 30 behind which are slidingly supported object carriers 90 which are laterally adjustable by means of screws 32. Each support is provided on its front side with an object 35—36, in the present instance vertical lines whose distance from one another can be adjusted as will now be evident. The visible surfaces of slides 90 and screens S*r* and S*l* should be of similar appearance, and the openings 30 as inconspicuous as possible, in order not to present to the eyes objects distracting from the test objects proper. The position of the screens S*l* and S*r* relatively to one another and to the head positioning means may be adjustable.

If the lines of both screens have approximately the same distance from each other the patient (unless he has diplopia in which case he will have to be tested as above described) will fuse the targets. Since, if he has no image disparity, the fusional areas will coincide, as indicated at 35c and 36c in Fig. 7, he will see only one set of lines somewhat as illustrated at A of Fig. 8.

The distance, from each other, of one set of lines is then increased by means of screws 32 until fusion breaks; this will either take place as indicated at B¹, where both sets of lines separate, or as shown at B¹, where only one set of lines is fused and the other disassociated.

The amount of separation change is noted. Instead of shifting the lines mechanically, their distance can be adjusted by optical means, for example with the aid of adjustable magnification lenses described in copending application Serial No. 713,701, filed March 2, 1934. Such sets would then be placed before the eyes as indicated in Fig. 6 at AS. The test is then repeated in oposite direction, and again the line distance or the test lens magnification at which fusion breaks noted. The resulting appearance is indicated at C of Fig. 6.

It will be evident from Fig. 7 that fusion breaks when the compensating range of the fusional areas is exhausted, that is when the distance of one set of lines 35¹ and 36¹ is changed so much in comparison to the distance of the other set of lines 35r and 36r that the respective fusional areas 35d and 36d (left eye) and 35c, 36c (right eye) cease to overlap.

If the person examined has no defects involving ocular image discrepancies, the values at which fusion breaks will be of substantially equal amounts on either side, and will indicate his fusional amplitude. The amplitude value effected by the fusional area of each eye will be approximately one-half of the value measured.

If, however, the patient has ocular image discrepancies, the measured values will not be equal for increase and decrease of the test object dimension, but differ by amounts governed by the difference in ocular image size which was initially compensated by the fusional areas and which amounts were not available for compensation during the test. If, for example, the test object dimension is changed (as in B₁ or B₂ of Fig. 8), an amount of 6%, and in the other direction (at C₁ or C₂) 4%, there will be an actual size difference of 1%, the ocular image for the right being in the horizontal direction 1% larger than that for the left eye. These relations are indicated at D of Fig. 8.

Instead of using an arrangement with separate targets, a unitary screen according to Fig. 3 may be used, whereby objects of similar character are presented to both eyes. As for example indicated in Fig. 9, the entire area behind screen S may be illuminated by means of an opal screen O and a lamp I, so that both eyes perceive star lights on a darker background. One ocular image is then changed by optical means indicated at SR until fusion breaks, or both ocular images may be changed in opposite sense, for the same purpose.

Referring again to the test described above with reference to Figs. 1 and 2, it will now be apparent that, instead of using a single target screen S, two like screens S₁ and S₂ may be used on a device similar to that shown in Fig. 6. An arrangement of this type is diagrammatically indicated in Fig. 10. When carrying out the test, the two target screens S₁ and S₂ are initially adjusted for visual superimposition of the two test patterns, that is, in a manner that they would appear, to a person having no defects, exactly as the single target. Generally speaking, the test will be the same as described with reference to Figs. 1 and 2, with the difference that this arrangement permits apparent juxtaposition of the ocular images by mechanically moving the targets, in addition to optically adjusting their apparent relative position by means of prisms, as above described.

It will now be evident that the herein described invention provides a test for binocular vision which operates with relative adjustments of ocular images, but does not depend on the presentation to the eyes of a distinct fixation object.

It should be understood that the present disclosure is for the purpose of illustration only and that this invention includes all modifications and equivalents which fall within the scope of the appended claims.

We claim:

1. In the art of testing binocular vision the method of correlating the ocular images formed through the eyes of a person which comprises presenting to each eye of the person test object means with elements for dimensional comparison undifferentiated with respect to fusible and non-fusible properties, shifting the relative location of said test object means as appearing to the respective eyes, thereby relating the conscious appearances of the ocular images of said test object means for comparison thereof, adjusting the relative dimensions of said test object means as appearing through the respective eyes while substantially maintaining throughout the test the distance of the respective dioptric images from the eyes, to obtain a dimensional relation of said ocular images, and measuring said adjustment.

2. The method of testing binocular vision for discrepancies of the ocular images formed through the eyes of the two eyes, comprising the formation in the respective eyes of images of test target means which have elements indicating dimensional properties of said target means, and whose relative positions may be compared, the elements for each eye being undifferentiated with respect to fusible and non-fusible properties, superposing the conscious appearances of the corresponding ocular images of said target means for comparison thereof in binocular vision, changing the relative size of said images by adjusting the position of said elements until they assume a predetermined location in superposed appearance, and determining the amount of said adjustment.

3. In the art of testing binocular vision the method of correlating the ocular images formed through the eyes of a person which comprises presenting to each eye of the person the same test object means with elements for dimensional comparison independently of a distinct fusion element, shifting the relative location of said test object means as appearing to the respective eyes, thereby relating the conscious appearances of the ocular images of said test object means for comparison thereof, adjusting the relative dimensions of said test object means as appearing through the respective eyes while substantially maintaining throughout the test the distance of the respectve dioptric images from the eyes, to obtain a dimensional relation of said ocular images, and measuring said adjustment.

4. In the art of testing binocular vision the method of correlating the ocular images formed through the eyes of a person which comprises presenting to each eye of the person a different test object means with elements for dimensional comparison and unsuited to induce fusion of any element thereof with any element of the test object means presented to the other eye, shifting the relative location of said test object means as appearing to the respective eyes, thereby relating the conscious appearances of the ocular images of said test object means for comparison thereof, adjusting the relative dimensions of said test object means as appearing through the respective eyes while substantially maintaining throughout the test the distance of the respective dioptric images from the eyes, to obtain a dimensional relation of said ocular images, and measuring said adjustment.

5. In the art of testing binocular vision the method of correlating the ocular images formed through the eyes of a person which comprises presenting to each eye of the person test object means with elements for dimensional comparison, unsuited to induce fusion of the ocular images of said test object means, shifting the relative location of said test object means as appearing to the respective eyes, thereby relating the conscious appearances of the ocular images of said test object means for comparison thereof, adjusting the relative dimensions of said test object means as appearing through the respective eyes while substantially maintaining throughout the test the distance of the respective dioptric images from the eyes, to obtain a dimensional relation of said ocular images, and measuring said adjustment.

6. In the art of testing binocular vision the method of correlating the ocular images formed through the eyes of a person which comprises presenting to each eye of the person a test object means having elements suited to induce fusion of the ocular images in the respective eyes and indicative of dimensional properties of said test object means, adjusting said object means as appearing to the eyes, until ocular images fusing said elements are observed, and changing the dimensional relation of the respective elements until fusion of at least one element breaks, and determining the amount of said change to determine fusional amplitude.

7. In the art of testing binocular vision the method of correlating the ocular images formed through the eyes of a person which comprises presenting to each eye of the person a test object means having fusible elements indicative of dimensional properties of said test object means, ajusting said object means as appearing to the eyes, until ocular images fusing said elements are observed, adjusting the dimensional relation of the appearances, through the respective eyes, of at least two of said elements in one direction until fusion of at least one element breaks, measuring the amount of said adjustment, adjusting the dimensional relation of the appearances, through the respective eyes, of at least two of said elements in the opposite direction until fusion of at least one element breaks, measuring the amount of said second adjustment, and determining the presence and amount of ocular image discrepancies from differences of said measured adjustments.

8. An instrument for testing binocular vision comprising target means presenting to each eye of a patient test object means having only elements for dimensional comparison which are undifferentiated with respect to fusible and non-fusible properties, means for presenting said test object means to the eyes by shifting the relative location of said test object means as appearing to the respective eyes, thereby relating the conscious appearances of the ocular images of said target means for comparison thereof, and means for adjusting the relative dimensions of said target means as appearing through the respective eyes while substantially maintaining the distance of the respective dioptric images from the eyes, to obtain a dimensional relation of said ocular images, and means for measuring said adjustment.

9. An instrument for testing binocular vision for discrepancies of the ocular images of the two eyes, comprising test target means having elements forming in the respective eyes images of said elements indicating dimensional properties of said target means, said elements being arranged for comparison of their relative positions, the elements for each eye being undifferentiated with respect to fusible and non-fusible properties, means for presenting said target means to the eyes by shifting the relative location of said target means as appearing to the respective eyes, thereby superposing the conscious appearances of the corresponding ocular images of said target means for comparison thereof in binocular vision, means for changing the relative size of said images by adjusting the position of said elements until they assume a predetermined location in superposed appearance, and means for determining the amount of said adjustment.

10. An instrument for testing binocular vision by correlating the ocular images formed through the eyes of a person comprising means for positioning the head of the person, a single test object means presented to each eye of the person and having only elements for dimensional comparison without inducing fusion, means for presenting said test object means to the eyes by shifting the relative location of said test object means as appearing to the respective eyes, means for adjusting the relative dimensions of said test object means as appearing through the respective eyes while substantially maintaining the distance of the respective dioptric images from the eyes, and means for measuring said adjustment.

11. An instrument for testing binocular vision by correlating the ocular images formed through the eyes of a person comprising means for positioning the head of the person, a single test object means presented to each eye of the person and having only elements for dimensional comparison without inducing fusion, means for presenting said test object means to the eyes by shifting the relative location of said test object means as appearing to the respective eyes, means for optically adjusting the relative dimensions of said test object means as appearing through the respective eyes while substantially maintaining the distance of the respective dioptric images from the eyes, and means for measuring said adjustment.

12. An instrument for testing binocular vision by correlating the ocular images formed through the eyes of a person, comprising two like test object means each presented to a respective eye and having only elements for dimensional comparison without inducing fusion, means for presenting said test object means to the eyes by mechanically changing the relative position of said test object means, means for adjusting the relative dimensions of said test object means as appearing through the respective eyes while substantially maintaining the distance of the respective dioptric images from the eyes, and means for measuring said adjustment.

13. An instrument for testing binocular vision by correlating the ocular images formed through the eyes of a person comprising means for positioning the head of the person, means for presenting to each eye of the person a different test object each test object having only elements for dimensional comparison which are unsuited to induce fusion of any element thereof with any element of the test object presented to the other eye, means for presenting said test object means to the eyes by shifting the relative location of said test object means as appearing to the respective eyes, thereby relating the conscious appearances of the ocular images of said test objects for comparison thereof, means for adjusting the relative dimensions of said test objects as appearing through the respective eyes while substantially maintaining the distance of the respective dioptric images from the eyes, and means for measuring said adjustment.

14. An instrument for testing binocular vision by correlating the ocular images formed through the eyes of a person, comprising means for positioning the head of the person, a test object means for each eye of the person having elements for dimensional comparison excluding fusion of the ocular images of said test object means, means for presenting said test object means to the eyes by shifting the relative location of said test object means as appearing to the respective eyes, thereby relating the conscious appearances of the ocular images of said test object means for comparison thereof, means for adjusting the relative dimensions of said test object means as appearing through the respective eyes while substantially maintaining the distance of the respective dioptric images from the eyes, to obtain a dimensional relation of said ocular images, and means for measuring said adjustment.

15. An instrument for testing binocular vision by correlating the ocular images formed through the eyes of a person, comprising means for positioning the head of the person, a fusible test object means for each eye of the person indicative of dimensional properties of said test object means, means for presenting said test object means to the eyes by shifting the relative location of said test object means as appearing to the respective eyes, thereby inducing fusion of said elements, means for changing the dimensional relation of the respective elements until fusion of at least one element breaks, and means determining the amount of said change, to determine fusional amplitude.

16. An instrument for testing binocular vision by correlating the ocular images formed through the eyes of a person, comprising means for positioning the head of the person, like test object means presented to each eye of the person having only fusible elements indicative of dimensional properties of said test object means, means for presenting said test object means to the eyes by shifting the relative location of said test object means as appearing to the respective eyes, thereby inducing fusion of said elements, means for adjusting the dimensional relation of the appearances through the respective eyes of at least two of said elements in one direction until fusion of at least one element breaks, and means for measuring the amount of said adjustment.

17. An instrument for testing binocular vision by correlating the ocular images formed through the eyes of a person, comprising means for positioning the head of the person, a fusible test object means for each eye of the person indicative of dimensional properties of said test object means, means for presenting said test object means to the eyes by shifting the relative location of said test object means as appearing to the respective eyes, thereby inducing fusion of said elements, means for optically changing the dimensional relation of the respective elements until fusion of at least one element breaks while substantially maintaining the distance of the respective dioptric images from the eyes, and means determining the amount of said change, to determine fusional amplitude.

18. An instrument for testing binocular vision by correlating the ocular images formed through the eyes of a person, comprising means for positioning the head of the person, a fusible test object means for each eye of the person indicative of dimensional properties of said test object means, means for presenting said test object means to the eyes by shifting the relative location of said test object means as appearing to the respective eyes, thereby inducing fusion of said elements, means for mechanically changing the dimensional relation of the respective elements until fusion of at least one element breaks, and means determining the amount of said change, to determine fusional amplitude.

19. A device for testing a pair of eyes comprising a pair of targets for the eyes respectively, each of the respective targets having only like spaced objects similarly arranged, means for presenting said targets to the eyes by shifting the relative location of said targets as appearing to the respective eyes, and means for producing relative movement between the said objects of one target relatively to the said objects of the other target to bring the images of the objects in the two eyes respectively into or out of registry.

ADELBERT AMES, JR.
GORDON H. GLIDDON.